US011323166B2

(12) United States Patent
Ahmed et al.

(10) Patent No.: US 11,323,166 B2
(45) Date of Patent: May 3, 2022

(54) METHOD FOR BEAMFORMING WEIGHTS TRANSMISSION OVER O-RAN FRONTHAUL INTERFACE IN C-RANS

(71) Applicant: MAVENIR NETWORKS, INC., Richardson, TX (US)

(72) Inventors: Wessam Mahmoud Afifi Ahmed, Plano, TX (US); Young-Han Nam, Plano, TX (US)

(73) Assignee: Mavenir Networks, Inc., Richardson, TX (US)

( * ) Notice: Subject to any disclaimer, the term of this patent is extended or adjusted under 35 U.S.C. 154(b) by 0 days.

(21) Appl. No.: 17/323,665

(22) Filed: May 18, 2021

(65) Prior Publication Data

US 2021/0273704 A1 Sep. 2, 2021

Related U.S. Application Data

(63) Continuation of application No. 17/068,274, filed on Oct. 12, 2020, now Pat. No. 11,043,998.

(60) Provisional application No. 62/940,453, filed on Nov. 26, 2019, provisional application No. 62/930,123, filed on Nov. 4, 2019.

(51) Int. Cl.
*H04B 7/06* (2006.01)
*H04W 72/04* (2009.01)

(52) U.S. Cl.
CPC ......... *H04B 7/0617* (2013.01); *H04B 7/0634* (2013.01); *H04W 72/04* (2013.01)

(58) Field of Classification Search
CPC .... H04B 7/0617; H04B 7/0634; H04W 72/04
See application file for complete search history.

(56) References Cited

U.S. PATENT DOCUMENTS

| 10,673,546 B2 | 6/2020 | Bedekar |
| 2015/0018042 A1 | 1/2015 | Radulescu et al. |
| 2020/0092229 A1 | 3/2020 | Levi et al. |

*Primary Examiner* — Vineeta S Panwalkar
(74) *Attorney, Agent, or Firm* — Ohlandt, Greeley, Ruggiero & Perle, LLP (57) ABSTRACT

A method of enabling an Open RAN-compatible radio unit (O-RU) to apply different beamforming weights to different physical resource blocks (PRBs) using a single sectionId and a single section extension type includes: specifying a first mode of operation in which flexible sending of beamforming weights from Open RAN-compatible distributed unit (O-DU) to Open RAN-compatible radio unit (O-RU) is provided; and providing, by the O-DU to the O-RU, i) a first parameter specifying the number of bundled physical resource blocks (PRBs) per a set of in-phase/quadrature (I/Q) beamforming weight pairs, each beamforming weight pair comprising an in-phase value and a quadrature value, and ii) a plurality of beamforming weight pairs for a plurality of transceivers associated with each bundle of PRBs. The method provides a new section extension type sent by the O-DU to the O-RU and including a compression parameter for processing or decompressing the beamforming weights.

5 Claims, 8 Drawing Sheets

Scheduling and beamforming commands frame format (Section Type "1")

Section Type 1: DL/UL control msgs

| 0 (msb) | 1 | 2 | 3 | 4 | 5 | 6 | 7 (lsb) | # of bytes | |
|---|---|---|---|---|---|---|---|---|---|
| transport header, see section 3.1.3 | | | | | | | | 8 | Octet 1 |
| dataDirection | payloadVersion | | | filterIndex | | | | 1 | Octet 9 |
| frameId | | | | | | | | 1 | Octet 10 |
| subframeId | | | | slotId | | | | 1 | Octet 11 |
| slotId | | startSymbolid | | | | | | 1 | Octet 12 |
| numberOfsections | | | | | | | | 1 | Octet 13 |
| sectionType = 1 | | | | | | | | 1 | Octet 14 |
| udCompHdr | | | | | | | | 1 | Octet 15 |
| reserved | | | | | | | | 1 | Octet 16 |
| sectionId | | | | | | | | 1 | Octet 17 |
| sectionId | | | | rb | symInc | startPrbc | | 1 | Octet 18 |
| startPrbc | | | | | | | | 1 | Octet 19 |
| numPrbc | | | | | | | | 1 | Octet 20 |
| reMask[11:4] | | | | | | | | 1 | Octet 21 |
| reMask[3:0] | | | | numSymbol | | | | 1 | Octet 22 |
| ef = 1 | beamId[14:8] | | | | | | | 1 | Octet 23 |
| beamId[7:0] | | | | | | | | 1 | Octet 24 |
| section extensions as indicated by "ef" | | | | | | | | var | Octet 25 |
| sectionId | | | | | | | | 1 | Octet N |
| sectionId | | | | rb | symInc | startPrbc | | 1 | N+1 |
| startPrbc | | | | | | | | 1 | N+2 |
| numPrbc | | | | | | | | 1 | N+3 |
| reMask[11:4] | | | | | | | | 1 | N+4 |
| reMask[3:0] | | | | numSymbol | | | | 1 | N+5 |
| ef = 0 | beamId[14:8] | | | | | | | 1 | N+6 |
| beamId[7:0] | | | | | | | | 1 | N+7 |
| section extensions as indicated by "ef" | | | | | | | | var | Octet M |

RAH

Fig. 1

| ef | extType = 0x1 | extLen | bfwCompHdr | bfwCompParam | bfwI (for TRX 0) | bfwQ (for TRX0) | remaining beamforming weights bfwI and bfwQ up to L TRXs | zero pad to 4-byte boundary |
|---|---|---|---|---|---|---|---|---|
| | 1 | 1 | 1 | var | var | var | var | var |
| | Octet 23 | Octet 24 | Octet 25 | Octet 26 | | | | |

Fig. 2

| | | |
|---|---|---|
| ef | 1 | Octet 23 |
| extType = 0x1 | | |
| extLen = 0000 0000 (default value for mode 2) | 1 | Octet 24 |
| bfwCompHdr | 1 | Octet 25 |
| bfwCompParam | var | Octet 26 |
| bfwI (for TRX 0) for startPrbc | var | |
| bfwQ (for TRX0) for startPrbc | var | |
| remaining beamforming weights bfwI and bfwQ up to LTRXs for startPrbc | var | |
| bfwI (for TRX 0) for startPrbc+1 | var | |
| bfwQ (for TRX0) for startPrbc+1 | var | |
| remaining beamforming weights bfwI and bfwQ up to LTRXs for startPrbc+1 | var | |
| ⋮ | | |
| bfwI (for TRX 0) for startPrbc + numPrbc | var | |
| bfwQ (for TRX0) for startPrbc + numPrbc | var | |
| remaining beamforming weights bfwI and bfwQ up to LTRXs for startPrbc + numPrbc | var | |
| zero pad to 4-byte boundary | var | |

Fig. 3

| ef | extType = 0x8 | | |
|---|---|---|---|
| | extLen | 2 | Octet 23 |
| | numBundPrb | 1 | Octet 24 |
| | bfwCompHdr | 1 | Octet 26 |
| | bfwCompParam | var | Octet 27 |
| | bfwI (for TRX 0 and PRB bundle 0) | var | Octet 28 |
| | bfwQ (for TRX0 and PRB bundle 0) | var | |
| | remaining beamforming weights bfwI and bfwQ up to L TRXs and PRB bundle 0 | var | |
| | bfwI (for TRX 0 and PRB bundle 1) | var | |
| | bfwQ (for TRX0 and PRB bundle 1) | var | |
| | remaining beamforming weights bfwI and bfwQ up to L TRXs and PRB bundle 1 | var | |
| | bfwI (for TRX 0 and last PRB bundle) | var | |
| | bfwQ (for TRX0 and last PRB bundle) | var | |
| | remaining beamforming weights bfwI and bfwQ up to L TRXs and last PRB bundle | var | |
| | zero pad to 4-byte boundary | | |

| | | | |
|---|---|---|---|
| ef | | | |
| | extType = 0x8 | 1 | Octet 23 |
| | extLen | 2 | Octet 24 |
| | numBundPrb | 1 | Octet 26 |
| | bfwCompHdr | 1 | Octet 27 |
| | bfwCompParam | var | Octet 28 |
| | beamId (for PRB bundle 0) | 2 | |
| | bfwI (for TRX 0 and PRB bundle 0) | var | |
| | bfwQ (for TRX0 and PRB bundle 0) | var | |
| | remaining beamforming weights bfwI and bfwQ up to L TRXs and PRB bundle 0 | var | |
| | beamId (for PRB bundle 1) | 2 | |
| | bfwI (for TRX 0 and PRB bundle 1) | var | |
| | bfwQ (for TRX0 and PRB bundle 1) | var | |
| | remaining beamforming weights bfwI and bfwQ up to L TRXs and PRB bundle 1 | var | |
| | beamId (for last PRB bundle) | 2 | |
| | bfwI (for TRX 0 and last PRB bundle) | var | |
| | bfwQ (for TRX0 and last PRB bundle) | var | |
| | remaining beamforming weights bfwI and bfwQ up to L TRXs and last PRB bundle | var | |
| | zero pad to 4-byte boundary | var | |

Fig. 6

| ef | extType = 0x8 | extLen | numBundPrb | bfwCompHdr | bfwCompParam | beamId (for PRB bundle 0) | beamId (for PRB bundle 1) | ... | beamId (for last PRB bundle) | bfwI (for TRX 0 and PRB bundle 0) | bfwQ (for TRX 0 and PRB bundle 0) | remaining beamforming weights bfwI and bfwQ up to L TRXs and PRB bundle 0 | bfwI (for TRX 0 and PRB bundle 1) | bfwQ (for TRX 0 and PRB bundle 1) | remaining beamforming weights bfwI and bfwQ up to L TRXs and PRB bundle 1 | bfwI (for TRX 0 and last PRB bundle) | bfwQ (for TRX 0 and last PRB bundle) | remaining beamforming weights bfwI and bfwQ up to L TRXs and last PRB bundle | zero pad to 4-byte boundary |
|---|---|---|---|---|---|---|---|---|---|---|---|---|---|---|---|---|---|---|---|
| | 1 | 2 | 1 | 1 | var | 2 | 2 | | 2 | var | var | var | var | var | var | var | var | var | var |
| | Octet 23 | Octet 24 | Octet 26 | Octet 27 | Octet 28 | | | | | | | | | | | | | | |

Fig. 7

| af | extType = 0x8 | 1 | Octet 23 |
|---|---|---|---|
| | extLen | 2 | Octet 24 |
| | numBundPrb | 1 | Octet 26 |
| | beamId (for PRB bundle 0) | 2 | |
| | beamId (for PRB bundle 1) | 2 | |
| | ... | | |
| | beamId (for last PRB bundle) | 2 | |
| | zero pad to 4-byte boundary | var | |

Fig. 8

METHOD FOR BEAMFORMING WEIGHTS TRANSMISSION OVER O-RAN FRONTHAUL INTERFACE IN C-RANS

CROSS-REFERENCE TO RELATED APPLICATIONS

The present application is a continuation of U.S. patent application Ser. No. 17/068,274, filed on Oct. 12, 2020, which claims the benefit of U.S. Provisional Patent Application No. 62/930,123, filed on Nov. 4, 2019, and U.S. Provisional Patent Application No. 62/940,453, filed on Nov. 26, 2019, each of which is incorporated by reference herein in its entirety.

BACKGROUND OF THE DISCLOSURE

1. Field of the Disclosure

The present disclosure relates to systems and methods for Radio Access Networks (RANs), and relates more particularly to Open RANs (O-RANs) for $4^{th}$-Generation (4G) and $5^{th}$-Generation (5G) based mobile networks.

2. Description of the Related Art

Conventional RANs were built employing an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the evolved node B (eNodeB or eNB) for 4G LTE or next generation node B (gNodeB or gNB) for 5G NR). In addition, conventional RANs use application specific hardware for processing, which make the conventional RANs difficult to upgrade and evolve. As future networks evolve to have massive densification of networks to support increased capacity requirements, there is a growing need to reduce the capital and operating costs of RAN deployment and make the solution scalable and easy to upgrade.

Cloud-based Radio Access Networks (CRANs) are networks where a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). CUs are usually located in the cloud on commercial off the shelf servers, while DUs can be distributed. The BBU may also be virtualized, in which case it is also known as vBBU. Radio Frequency (RF) interface and real-time critical functions can be processed in the remote radio unit (RRU).

For the RRU and DU to communicate, an interface called the fronthaul is provided. $3^{rd}$ Generation Partnership Project (3GPP) has defined 8 options for the split between the BBU and the RRU among different layers of the protocol stack. There are multiple factors affecting the selection of the fronthaul split option such as bandwidth, latency, implementation cost, virtualization benefits, complexity of the fronthaul interface, expansion flexibility, computing power, and memory requirement. One of the splits recently standardized by O-RAN Alliance is split option 7-2x (Intra-Physical (PHY) layer split). In the uplink (UL), Fast Fourier Transform (FFT), Cyclic Prefix (CP) removal, and possibly pre-filtering functions reside in the RU, while the rest of PHY functions reside in the DU. In the downlink (DL), inverse Fast Fourier Transform (iFFT), CP addition, and beamforming functions reside in the RU, the rest of PHY functions reside in the DU. This split has multiple advantages such as simplicity, transport bandwidth scalability, beamforming support, interoperability, support for advanced receivers and inter-cell coordination, lower O-RU complexity, future proof-ness, interface and functions symmetry.

Although split option 7-2x has relatively low fronthaul (FH) throughput compared to split options 7-1 or split option 8, it is always beneficial to reduce the FH throughput rate as this will have a direct impact on scalability, the transport medium and the Ethernet cards at the ORAN-compliant DU (O-DU) and ORAN-compliant RU (O-RU).

One of the main features that is used in many systems such as LTE massive multiple input, multiple output (mMIMO), 5G millimeter wave (mmWave), and 5G mMIMO is beamforming. Beamforming is essential in mMIMO systems to be able to serve multiple users at the same time using the same time/frequency resources. Furthermore, since the received power is inversely proportional to the carrier frequency, beamforming is essential for mmWave systems to increase cell coverage, and hence the signal-to-noise ratio (SNR) at the receiver. This will help increase the data throughput by using higher-order modulation schemes via link adaptation.

In the current O-RAN specifications, the beamforming weights are sent in a certain way (beamforming weights are mapped per physical resource blocks (PRBs) that present an unnecessary overhead and latency in processing. This overhead and latency are more severe in mMIMO systems.

The existing O-RAN specifications explain the exact method of sending the beamforming weights in the downlink direction from the O-DU to the O-RU. This method as well as a background on the different planes in the O-RAN specifications are explained in this section.

There are four planes specified in the O-RAN specs namely user-plane (U-plane), control plane (C-plane), synchronization plane (S-plane), and management plane (M-plane). The main focus of this invention is the C-plane messages.

The main purpose of the C-plane messages is to transmit data-associated control information required for processing of user data (e.g., scheduling and beamforming commands). These messages are sent separately for DL related commands and UL related commands.

A common frame format is used for C-Plane messages, consisting of a transport layer and an application layer. The application layer is within the transport layer payload and consists of a common header for time reference, followed by information and parameters dependent and specific to the Section Type in use. Multiple sets of section data of the same Section Type value can be lined up one after another within the payload. To minimize packet rate over the interface, transmitter should fill messages with as many subsequent sections (with or without sequential section IDs) as possible.

To simplify the description of the invention, the following sections of this document focuses on a specific beamforming method (beamforming via sending real-time weights) which can be applied to specific section types (Section types 1 and 3) using section extension type 1. However, this should not limit the scope of the invention since the same/variant of the method may be applied to other existing beamforming methods or future beamforming methods that will be standardized by O-RAN alliance.

Section Type 1 is used for most Downlink and Uplink radio channels. The fields of Section type 1 can be explained as follows:

Transport Layer
Application Layer
  Common Header Fields
    dataDirection (data direction (gNB Tx/Rx)) field: 1 bit
    payloadVersion (payload version) field: 3 bits
      value="1" shall be set (1st protocol version for payload and time reference format)
    filterIndex (filter index) field: 4 bits
    frameId (frame identifier) field: 8 bits
    subframeId (subframe identifier) field: 4 bits
    slotID (slot identifier) field: 6 bits
    startSymbolid (start symbol id) field: 6 bits
    numberOfsections (number of sections) field: 8 bits
    sectionType (section type) field: 8 bits
      value="1" shall be set
    udCompHdr (user data compression header) field: 8 bits 11
    reserved (reserved for future use) field: 8 bits
  Section Fields
    sectionId (section identifier) field: 12 bits
    rb (resource block identifier) field: 1 bit
    symInc (symbol number increment command) field: 1 bit
    startPrbc (starting PRB of data section description) field: 10 bits
    numPrbc (number of contiguous PRBs per data section description) field: 8 bits
    reMask (resource element mask) field: 12 bits
    numSymbol (number of symbols) field: 4 bits
    ef (extension flag) field: 1 bit
    beamId (beam identifier) field: 15 bits Beamforming via sending real-time weights:
In this method, the O-DU generates complex weights that create the beam and send these weights to the O-RU via the fronthaul interface. To be able to do so, the O-DU needs to know the specific antenna characteristics of the O-RU including how many antenna elements are present in the vertical and horizontal directions and the antenna element spacing, among other properties. The weight vector associated with each beam has a beamId value.

Section Extension Type 1:
This section applies to the sending of beamforming weights from the O-DU to the O-RU.
When this is done, the weights are sent along with a beamID which is meant to allow those same weights to be used in future C-Plane messages by invoking the same beamID (without the need to send the weights again).
This section extension applies to section types 1 and 3.

Figure 1:
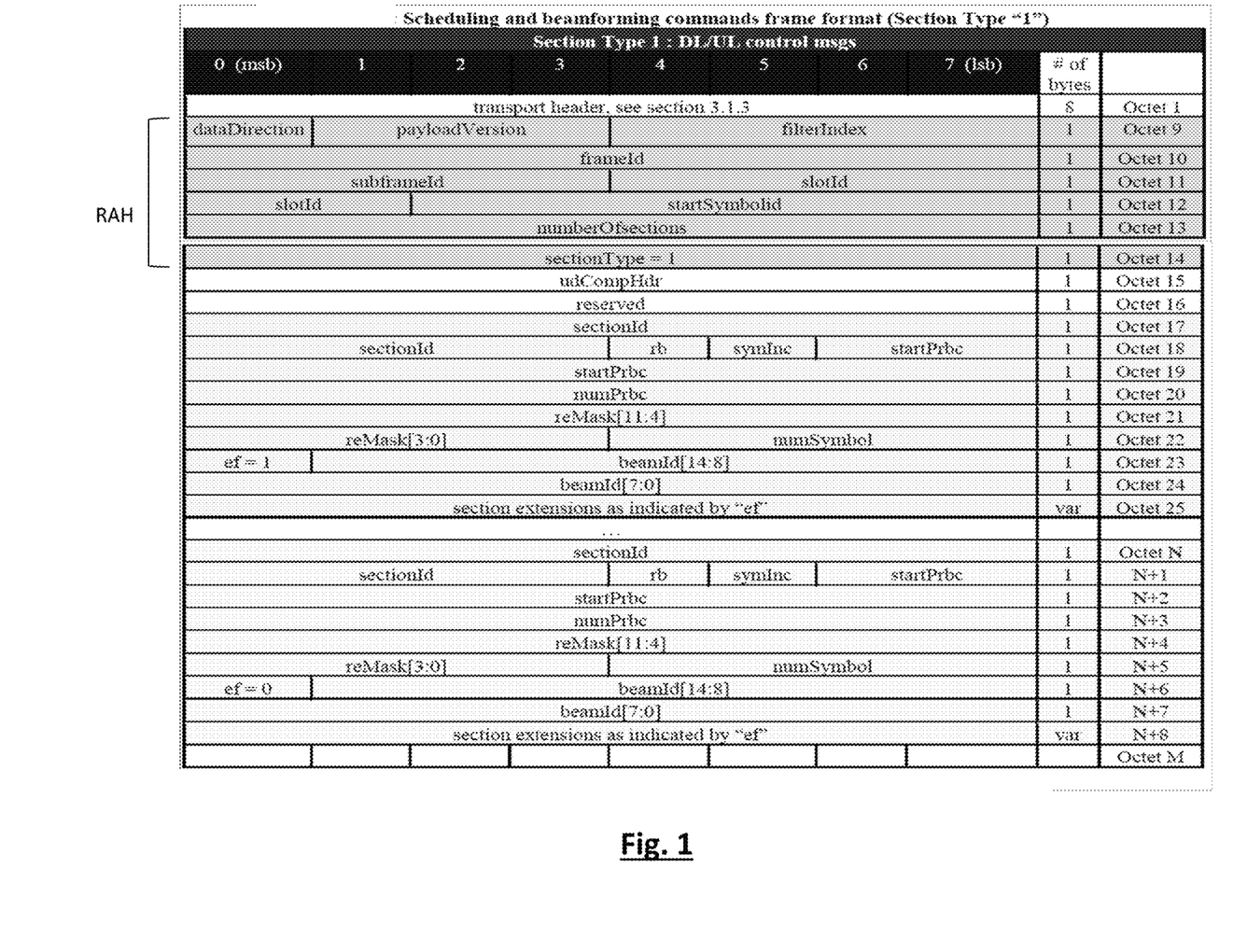
FIG. 1 illustrates the scheduling and beamforming commands frame format (Section Type "1") according to the O-RAN specifications.
Figure 2:
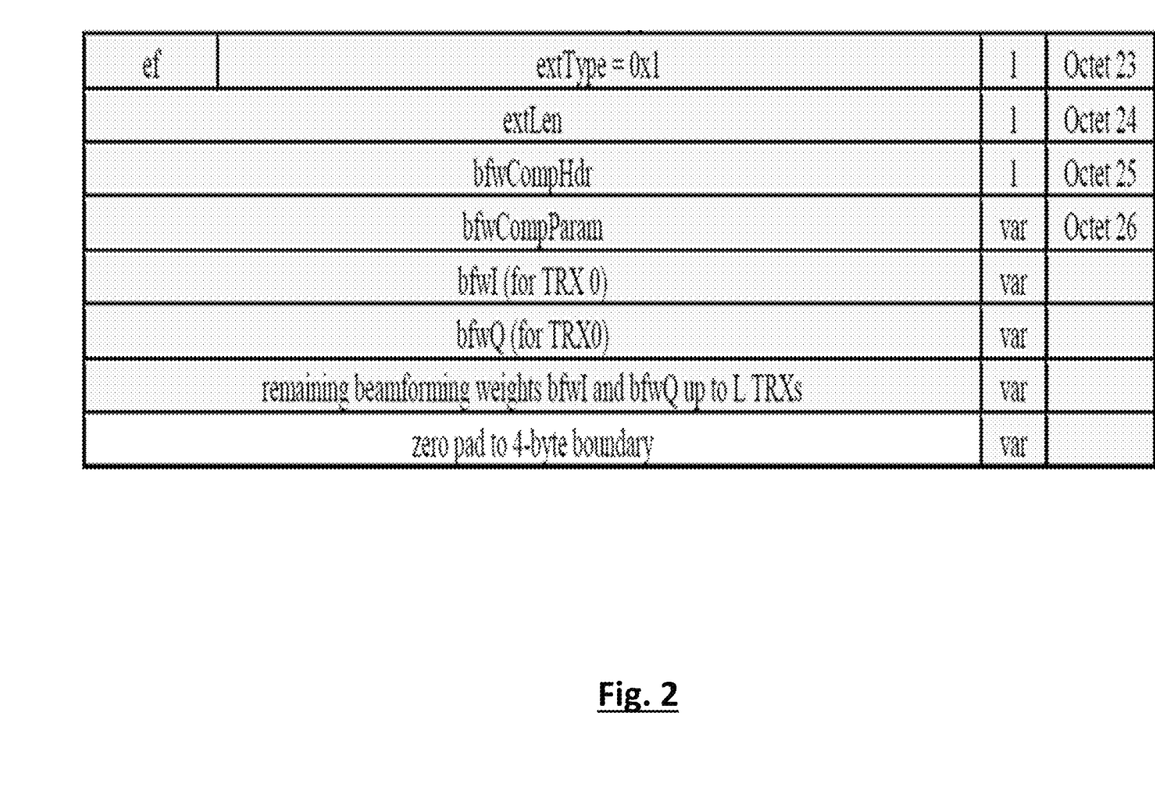
FIG. 2 illustrates the existing extension type 1 data format according to the O-RAN specifications.

FIG. 1 illustrates scheduling and beamforming commands frame format for section type "1". FIG. 2 illustrates the current extension type "1" data format.

Within Section Type 1 message, there could be multiple sections with different section IDs, as shown in FIG. 1. As shown in FIG. 1, below the transport header section, a radio application header section (labeled "RAH") is provided, followed by repeated sections each starting with sectionID. Each section has the beamId and the beamforming weights (included in the section extension, next table) that are applied to the PRBs indexed by startPrbc and numPrbc. In this known approach, the number of PRBs defined under a specific sectionId in a C-plane message could be larger than or equal to one. The specific RBs are identified by startPrbc and numPrbc. There is a maximum of L beamforming weights under section extension type 1, regardless of the number of PRBs defined in the sectionId of the C-plane message, where L is the number of transceivers (TRX) or processing chains defined. Note that each beamforming weight consists of two complex numbers: The I and Q values. Let N be the number of beamforming weights in Section extension type 1. Hence, in the current known approach, N is always equal to L.

The number of beamforming weights in the section extension type 1 is defined implicitly using a field called extLen in section extension type 1. The formal definition of extLen is as follows:

extLen (extension length)
  Description: This parameter provides the length of the section extension in units of 32-bit (or 4-byte) words. The value zero is reserved, so there is always at least one word in the extension (the word containing the extType and extLen).
  Value range: {all zeros—all ones}—form one word to 255 words.
  Type: unsigned integer.
  Field length: 8 bits.

The RU executes the following steps to apply the beamforming weights to the designated PRBs:
  Apply the first beamforming weights (bfwI and bfwQ) in section extension type 1 for TRX 0 to all the PRBs defined under the sectionId of the C-plane message.
  Apply the second beamforming weights (bfwI and bfwQ) in section extension type 1 for TRX 1 to all the PRBs defined under the sectionId of the C-plane message.
  . . .
  Apply the last (or the $L^{th}$) beamforming weights (bfwI and bfwQ) in section extension type 1 for TRX L−1 to all the PRBs defined under the sectionId of the C-plane message.

The current approach for sending the beamforming weights is not efficient due to the following reasons:
High fronthaul throughput:
  For certain applications (e.g., mMIMO), the O-DU needs to send different beamforming weights per PRB per user equipment (UE). Using the current approach specified in O-RAN specs, the O-DU needs to send multiple sections (based on the number of PRBs and the number of UEs) to the O-RU. For each section, the O-DU specifies the PRBs, the beamID, along with the beamforming weights for these specific PRBs. These beamforming weights are sent using section extension type 1. This is accompanied by an overhead.
  For specific transmission modes in LTE (e.g., TM7-TM10), where Data resource elements (REs) are multiplexed with UE-specific reference signals (i.e., DMRS REs) in the frequency domain, different compression schemes can be applied for different data types. As an example, modulation compression is needed for data REs to reduce the fronthaul throughput, while a basic block floating point compression scheme can be used for DMRS REs. To do this, the O-DU needs to configure two C-plane messages with two different reMasks (one with DMRS RE locations and the other with data RE locations), since we can have only one compression method per C-plane message. In this case, the section configuration overhead can be doubled.

Latency and timing:
In advanced wireless systems such as mMIMO, there are strict timing requirements to schedule multiple-layer beamforming weights (e.g., 16 layers). Sending hundreds of additional overhead bits over the fronthaul interface may have an impact on the system performance in terms of processing delay. This includes the overhead of parsing multiple packets.

Therefore, there is a need for an improved way of sending beamforming weights such that overhead and latency in processing are reduced.

SUMMARY OF THE DISCLOSURE

This invention focuses on the method where the beamforming weights are sent over the fronthaul interface. This invention provides methods for reducing the overhead accompanied by sending the beamforming weights from the O-DUs to the O-RUs. Furthermore, the proposed method reduces the latency accompanied by parsing the ethernet packets and processing the beamforming weights.

One example method for sending real-time complex beamforming weights from the O-DU to the O-RU includes aggregating the beamforming weights of consecutive PRBs in Section extension type 1 fields in the same C-plane message (e.g., Section type 1 or Section type 3).

Another example method for sending real-time complex beamforming weights from the O-DU to the O-RU includes defining a new section extension type, where a single or multiple PRBs can be bundled together and beamformed using the same I/Q beamforming weights. This reduces the fronthaul throughput by avoiding sending the header multiple times. It also helps in reducing the processing delay.

The example embodiments of the present disclosure include 0-RAN compliant distributed units (O-DUs) and O-RAN compliant radio units (O-RUs) that are capable of beamforming.

The example embodiments of the present disclosure include O-RAN compliant combined baseband unit including O-CU and O-DU communicating via the O-RAN fronthaul interface to O-RUs that are capable of beamforming.

In the example embodiments of the present disclosure, both O-DUs and O-RUs can act as evolved node B (eNB) and/or next generation node B (gNB) that provides wireless connectivity to UEs in licensed (e.g., 4G and 5G bands), unlicensed (e.g., 5 GHz UNII band), and shared spectrum (e.g., CBRS band).

The present disclosure is intended to encompass other wireless systems that support beamforming and are 0-RAN compliant.

DETAILED DESCRIPTION

Figure 3:
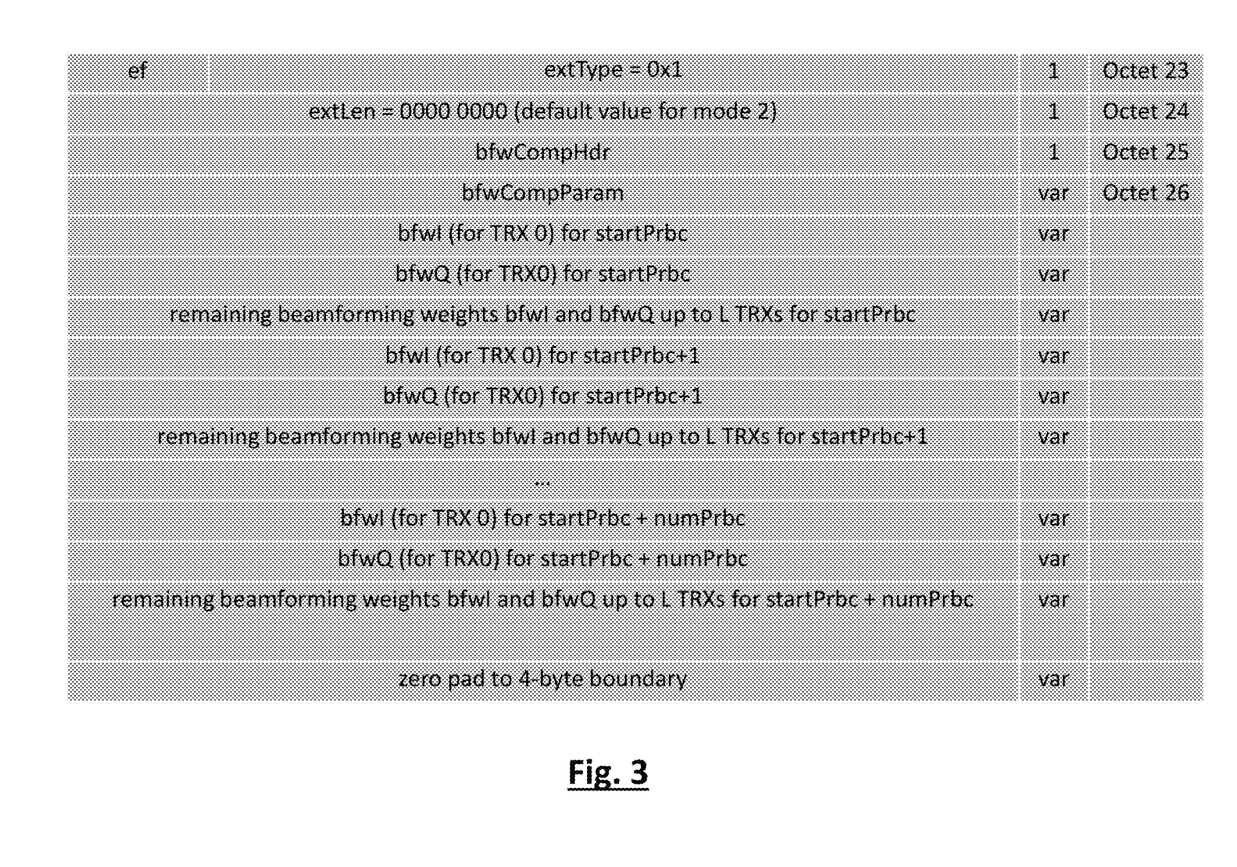
FIG. 3 illustrates extension type 1 data format for a new flexible mode according to the present disclosure.

In an example embodiment of the present disclosure, a new flexible mode under section extension type 1 is defined, which extension type 1 data format for a new flexible mode ("mode 2") is illustrate in FIG. 3. This approach allows the O-RU to apply different beamforming weights to different PRBs using a single sectionId and a single section extension type 1, in a backward compatible fashion with the known conventional approach. This can be done as follows:
1) Define a new mode of operation, where the number of beamforming weights in the section extension type 1 is equal to L*numPrbs, where L is the number of TRXs and numPrbs is the number of physical resource blocks.
2) To identify this new mode at the O-RU, the O-DU needs to set extLen=0. Since this value is reserved in the current specs, the new method will still be backward compatible.
3) If extLen=0, the O-RU knows that the new mode of operation needs to be applied.
4) In this case, the number of beamforming weights in section extension type 1 will be by default: L*numPrbs and will not be conveyed to the O-RU.
5) The O-RU applies the beamforming weights as follows:
   a. Apply the first beamforming weights (bfwI and bfwQ) in section extension type 1 for TRX 0 to the first PRB defined under the sectionId of the C-plane message.
   b. Apply the second beamforming weights (bfwI and bfwQ) in section extension type 1 for TRX 1 to the first PRB defined under the sectionId of the C-plane message.
   c. . . .
   d. Apply the $L^{th}$ beamforming weights (bfwI and bfwQ) in section extension type 1 for TRX L−1 to the first PRB defined under the sectionId of the C-plane message.
   e. Apply the $L^{th}$+1 beamforming weights (bfwI and bfwQ) in section extension type 1 for TRX 0 to the second PRB defined under the sectionId of the C-plane message.
   f. Apply the $L^{th}$+2 beamforming weights (bfwI and bfwQ) in section extension type 1 for TRX 1 to the second PRB defined under the sectionId of the C-plane message.
   g. . . .
   h. Apply the $2L^{th}$ beamforming weights (bfwI and bfwQ) in section extension type 1 for TRX L−1 to the second PRB defined under the sectionId of the C-plane message.
   i. . . .
   j. Apply the (numPrbc−1)*$L^{th}$+1 beamforming weights (bfwI and bfwQ) in section extension type 1 for TRX 0 to the last (or numPrbc) PRB defined under the sectionId of the C-plane message.
   k. Apply the (numPrbc−1)*$L^{th}$+2 beamforming weights (bfwI and bfwQ) in section extension type 1 for TRX 1 to the last (or numPrbc) PRB defined under the sectionId of the C-plane message.

l. . . .

m. Apply the numPrbc*$L^{th}$ beamforming weights (bfwI and bfwQ) in section extension type 1 for TRX L−1 to the last (or numPrbc) PRB defined under the sectionId of the C-plane message.

In summary, the RU applies the $k^{th}$ beamforming weights (bfwI and bfwQ), k=1, 2, . . . , numPrbc*L in section extension type 1 for TRX j, j=0, 1, . . . , L−1 to the ith PRB, i=1, 2, . . . , numPrbc defined under the sectionId of the C-plane message. For each iteration, the RU increments k by 1 and increments j by 1, where j resets at L−1. The RU increments i by 1 once j resets.

According to this embodiment, the value configured extLen indicates how beamforming weights are transported through the interface and applied. If extLen=0, the number of beamforming weights is equal to numPrbc*L, and RU applies these beamforming weights respectively across the TRX first and then across PRBs. On the other hand, extLen>0, the number of beamforming weights is equal to L, and RU applies these beamforming weights respectively across the TRX for a first PRB, and the same set of beamforming weights are applied across the TRX for each of the rest of the numPrbc PRBs defined in the C-plane message.

In another example embodiment of the present disclosure, a new section extension type 8 is provided. In the following description, the changes needed in the O-RAN specifications to include a new section extension type 8 is provided. It should be noted that the extension type number 8 is provided just as an example, and the number can be any positive integer from the set [8, 127].

First, a new section extension (type 8) is added, as shown in Table 1 below, which shows the various section extension parameters and the associated definitions within the C-Plane.

TABLE 1

| extType | meaning | extLen | extension parameters | octets | meaning |
|---|---|---|---|---|---|
| 0 | reserved | 1 (1 word) | Reserved | 1 | for future use |
|   |   |   | reserved | 1 | for future use |
| 1 | beamforming weights | var | bfwCompHdr | 1 | bitWidth(3:0) \| compMeth(3:0) |
|   |   |   | bfwCompParam | 1 | depends on compr. method |
|   |   |   | bfwI (for TRX 0) | var | beamforming weight I value |
|   |   |   | bfwQ (for TRX 0) | var | beamforming weight Q value |
|   |   |   | . . . |   |   |
|   |   |   | bfwI (for last TRX) | var | beamforming weight I value |
|   |   |   | bfwQ (for last TRX) | var | beamforming weight Q value |
|   |   |   | zero-pad to 4-byte boundary | var |   |
| 2 | beamforming attributes | var | bfaCompHdr | 2 | BF attributes compr. header |
|   |   |   | bfAzPt | var | BF azimuth pointing param |
|   |   |   | bfZePt | var | BF zenith pointing param |
|   |   |   | bfAz3dd | var | BF azimuth beamwidth param |
|   |   |   | bfZe3dd | var | BF zenith beamwidth param |
|   |   |   | bfAzSI | 3b | BF azimuth sidelobe param |
|   |   |   | bfZeSI | 3b | BF zenith sidelobe param |
| 3 | DL Precoding configuration parameters and indications | var (3 or 4 words) | codebookIndex | 1 | precoder codebook |
|   |   |   | layerId | 4b | layer ID for DL Tx |
|   |   |   | txScheme | 4b | transmission scheme |
|   |   |   | numLayers | 4b | number of layers in DL Tx |
|   |   |   | crsReMask | 12b | CRS RE Mask |
|   |   |   | crsSymNum | 4b | CRS symbol number |
|   |   |   | crsShift | 1b | CRS shift command |
|   |   |   | beamIdAP1 | 2 | Beam ID, Antenna Port 1 |
|   |   |   | beamIdAP2 | 2 | Beam ID, Antenna Port 2 |
|   |   |   | beamIdAP3 | 2 | Beam ID, Antenna Port 3 |
| 4 | modulation compr. params | 0 | csf | 1b | constellation shift flag |
|   |   |   | modCompScaler | 15b | mod. compr. scale value |
| 5 | modulation compression additional scaling parameters | var | mcScaleReMask | 12b | Position of same scaling bits |
|   |   |   | csf | 1b | constellation shift flag |
|   |   |   | mcScaleOffset | 15b | added mod. compr. scale values |
| 6 | Non-contiguous PRB allocation | 2 (2 words) | rbgSize | 3b | number of PRBs in the group |
|   |   |   | rbgMask | 28b | mask of RBGs in the symbol(s) |
|   |   |   | symbolMask | 14b | mask of symbols in the slot |
| 7 | Multiple-eAxC designation | 1 | eAxCmask | 16b | eAxC mask |
| 8 | Flexible beamforming weights | var | numBundPrb | 1 | Number of bundled PRBs |
|   |   |   | bfwCompHdr | 1 | bitWidth(3:0) \| compMeth(3:0) |
|   |   |   | bfwCompParam | 1 | depends on compr. method |
|   |   |   | bfwI (for TRX 0 and PRB bundle 0) | var | beamforming weight I value for bundle 0 |
|   |   |   | bfwQ (for TRX 0 and PRB bundle 0) | var | beamforming weight Q value for bundle 0 |
|   |   |   | . . . |   |   |
|   |   |   | bfwI (for last TRX and PRB bundle 0) | var | beamforming weight I value for bundle 0 |
|   |   |   | bfwQ (for last TRX and PRB bundle 0) | var | beamforming weight Q value for bundle 0 |
|   |   |   | . . . | var |   |
|   |   |   | bfwI (for TRX 0 and last PRB bundle) |   | beamforming weight I value for last bundle |
|   |   |   | bfwQ (for TRX 0 and last PRB bundle) |   | beamforming weight Q value for last bundle |
|   |   |   | . . . |   |   |
|   |   |   | bfwI (for last TRX and last PRB bundle) |   | beamforming weight I value for last bundle |
|   |   |   | bfwQ (for last TRX and last PRB bundle) |   | beamforming weight Q value for last bundle |
|   |   |   | zero-pad to 4-byte boundary |   |   |

TABLE 1-continued

| extType | meaning | extLen | extension parameters | octets | meaning |
|---|---|---|---|---|---|
| 9-127 | reserved | 1 (1 word) | Reserved<br>Reserved | 1<br>1 | for future use<br>for future use |

Second, the bitwidth of extLen is increased to 2 bytes instead of 1 byte to accommodate the flexible beamforming weights.

Third, a new field, numBundPrb, is added in section extension type 8 compared to section extension type 1, which field numBundPrb can be defined as follows:

numBundPrb (Number of bundled PRBs per I/Q beamforming weights)

Description: This parameter is the number of bundled PRB(s) per a set of I/Q beamforming weight pairs (e.g., each set can comprise L weight pairs, L=1 or more, each pair consisting of in-phase (I) and quadrature (Q) values). As an example, if numBundPrb=1, this means PRBs are not bundled, and the O-DU provides a separate set of beamforming weights for each PRB. As another example, if numBundPrb=5, and the total number of PRBs is 100, then the O-DU provides to the O-RU 20 sets of beamforming weight pairs, each set (e.g., L weight pairs corresponding to L transceivers of the O-RU) applied to a bundle of 5 PRBs. The number of I/Q beamforming weights per TRX in section extension type 8 should be equal to the total number of PRBs identified under sectionId in the C-plane message (using startPrbc and numPrbc) divided by numBundPrb. When the division outcome is fractional value, one additional I/Q beamforming weight for each respective TRX is included to cover the orphan PRBs. The value zero is reserved.

In another embodiment, the orphan PRBs can be beamformed using the same set of I/Q beamforming weights used for the last PRB bundle.

Value range: {all zeros—all ones}.
Type: unsigned integer.
Field length: 8 bits.

Figure 4:
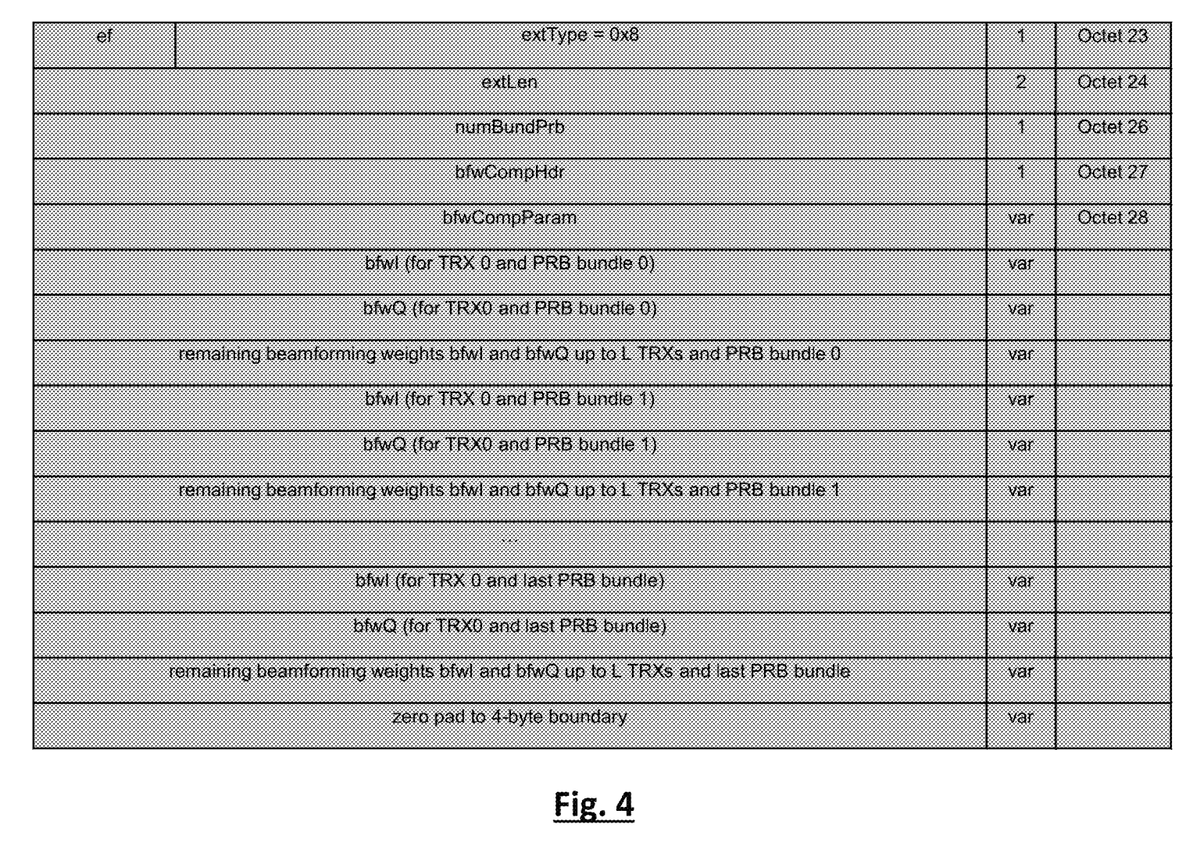
FIG. 4 illustrates a data format for a new section extension type 8 (or any non-negative number) according to the present disclosure.

Fourth, data format for the new section extension type 8 is defined, as shown in FIG. 4.

ExtType=8: Flexible Beamforming Weights Extension Type

This section applies to the flexible sending of beamforming weights from the O-DU to the O-RU. The O-DU provides the numBundPrb parameter, which informs the O-RU how many PRBs need to be bundled together and shares the same beamforming weights. This section extension applies only to section types 1 and 3.

Other parameters of the new section extension type 8 include bfwI and bfwQ.

bfwI (beamforming weight in-phase value).

Description: This parameter is the In-phase beamforming weight value. The total number of weights in the section depends on the number TRX at the RU and the number of bundled PRBs per I/Q beamforming weights.

Value range: {all zeros—all ones}.
Type: signed integer.
Field length: 1-16 bits.

bfwQ (beamforming weight quadrature value)

Description: This parameter is the Quadrature beamforming weight value. The total number of weights in the section depends on the number TRX at the RU and the number of bundled PRBs per I/Q beamforming weights.

Value range: {all zeros—all ones}.
Type: signed integer.
Field length: 1-16 bits.

An example embodiment of the present disclosure includes 0-RAN compliant distributed units (O-DUs) and O-RAN compliant radio units (O-RUs) that are capable of beamforming.

Figure 5:
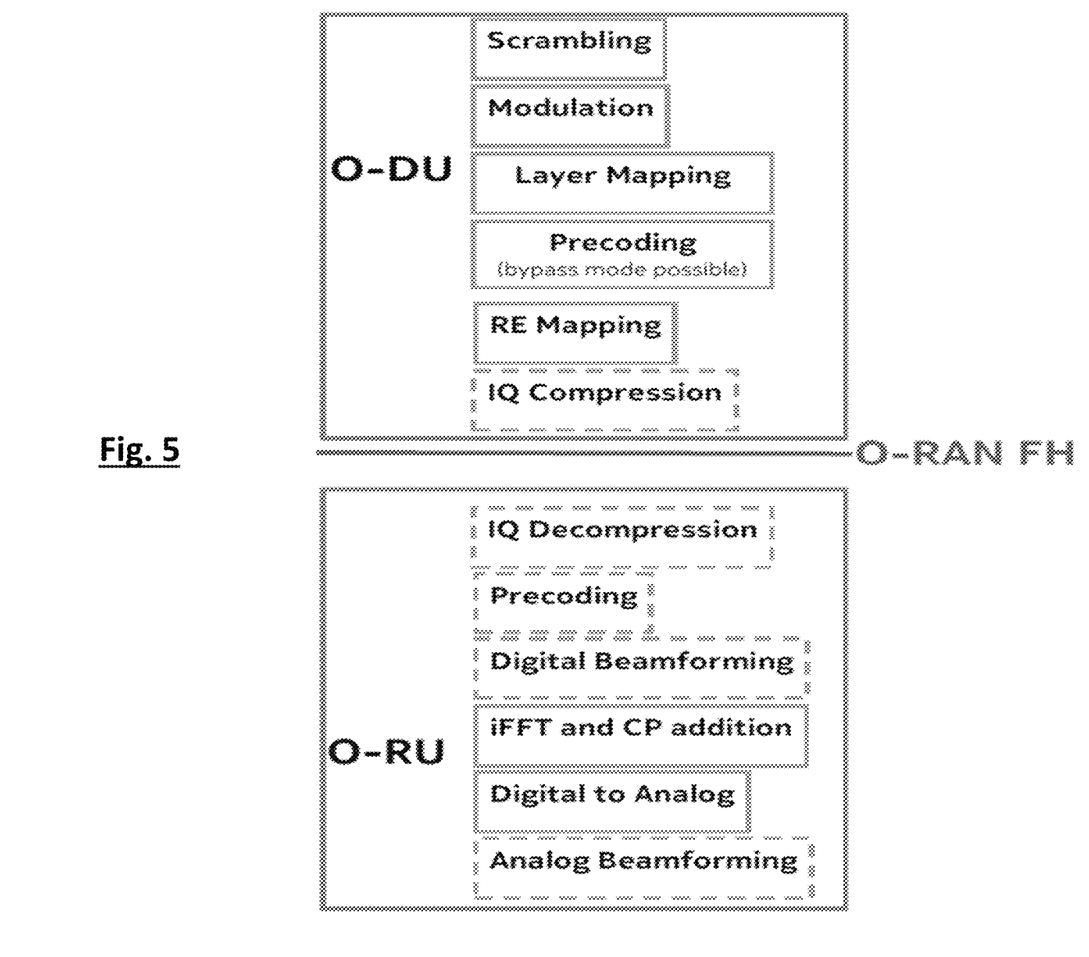
FIG. 5 illustrates an example 0-RAN system architecture.

FIG. 5 illustrates an example 0-RAN system architecture, in which the upper physical layer (U-PHY) blocks such as the scrambling, modulation, layer mapping, RE mapping, and I/Q compression (as well as optional precoding, which may be bypassed in bypass mode) can be implemented in the O-DU. The I/Q decompression, precoding, digital beamforming, IFFT, CP addition, digital-to-analog conversion, and optionally analog beamforming can be implemented in the O-RU. O-RAN fronthaul (FH) is shown between O-DU and O-RU.

An example embodiment of the present disclosure includes 0-RAN compliant combined central unit (O-CU) and distributed unit (O-DU) communicating via the O-RAN fronthaul interface to O-RUs that are capable of beamforming.

In the example embodiments of the present disclosure, both O-DUs and O-RUs can act as evolved node B (eNB) and/or next generation node B (gNB) that provides wireless connectivity to UEs in licensed (e.g., 4G and 5G bands), unlicensed (e.g., 5 GHz UNII band), and shared spectrum (e.g., CBRS band).

The present disclosure is intended to encompass other wireless systems that support beamforming and are 0-RAN compliant.

In another example embodiment of the present disclosure, two new section types are defined that are identical to section type 1 and section type 3 defined in the O-RAN specs except for the following differences. First, the new section types 1 and 3 which are based on the section types 1 and 3 defined in the O-RAN specs, respectively, don't include the beamId field. Second, the new section types 1 and 3 are coupled with the new section extension type 8 defined and described earlier in this disclosure, where the O-DU sends multiple beamforming weight sets, and each set is applied to a bundle of PRB s.

The new section type 1 (which can be referred to as section type 8, or alternatively, by any number from 8-255) will be defined as follows. Section type 8 is used for most Downlink and Uplink radio channels when multiple sets of beamforming weights are sent in the new section extension type 8 defined in this disclosure. The fields of section type 8 can be explained as follows:

Transport Layer
Application Layer
Common Header Fields
dataDirection (data direction (gNB Tx/Rx)) field: 1 bit
payloadVersion (payload version) field: 3 bits value="1" shall be set (1st protocol version for
payload and time reference format)
filterIndex (filter index) field: 4 bits
frameId (frame identifier) field: 8 bits
subframeId (subframe identifier) field: 4 bits
slotID (slot identifier) field: 6 bits
startSymbolid (start symbol id) field: 6 bits
numberOfsections (number of sections) field: 8 bits
sectionType (section type) field: 8 bits
value="1" shall be set
udCompHdr (user data compression header) field: 8 bits 11
reserved (reserved for future use) field: 8 bits
Section Fields
sectionId (section identifier) field: 12 bits
rb (resource block identifier) field: 1 bit
symInc (symbol number increment command) field: 1 bit
startPrbc (starting PRB of data section description) field: 10 bits
numPrbc (number of contiguous PRBs per data section description) field: 8 bits
reMask (resource element mask) field: 12 bits
numSymbol (number of symbols) field: 4 bits
ef (extension flag) field: 1 bit Note that the field "beamId" doesn't exist in section type 8 compared to section type 1 defined in the O-RAN specs.

The same concept can be applied to the new section type 3 (which can be referred to as section type 9, or alternatively, by any number from 8-255). Specifically, section type 9 will be defined as follows. Section type 9 is used for PRACH and mixed-numerology channels when multiple sets of beamforming weights are sent in the new section extension type 8 defined and described in this disclosure. The fields of section type 9 can be explained as follows:

Transport Layer
Application Layer
Common Header Fields
dataDirection (data direction (gNB Tx/Rx)) field: 1 bit
payloadVersion (payload version) field: 3 bits
value="1" shall be set (1$^{st}$ protocol version for payload and time reference format)
filterIndex (filter index) field: 4 bits
frameId (frame identifier) field: 8 bits
subframeId (subframe identifier) field: 4 bits
slotID (slot identifier) field: 6 bits
startSymbolid (start symbol identifier) field: 6 bits
numberOfsections (number of sections) field: 8 bits
sectionType (section type) field: 8 bits
value="3" shall be set
timeOffset (time offset) field: 16 bits
frameStructure (frame structure) field: 8 bits
cpLength (cyclic prefix length) field: 16 bits
udCompHdr (user data compression header) field: 8 bits
Section Fields
sectionID (section identifier) field: 12 bits
rb (resource block identifier) field: 1 bit
symInc (symbol number increment command) field: 1 bit
startPrbc (starting PRB of data section description) field: 10 bits
numPrbc (number of contiguous PRBs per data section description) field: 8 bits
reMask (resource element mask) field: 12 bits
numSymbol (number of symbols) field: 4 bits
ef (extension flag) field: 1 bit
freqOffset (frequency offset) field: 24 bits
reserved (reserved for future use) field: 8 bits Note that the field "beamId" doesn't exist in section type 9 compared to section type 3.

In another example embodiment of the present disclosure, two new section types are defined that are identical to section type 1 and section type 3 defined in the O-RAN specs except for the following differences. First, the new section types 1 and 3 which are based on the section types 1 and 3 defined in the O-RAN specs, respectively, include multiple beamId fields. Second, the new section types 1 and 3 are coupled with the new section extension type 8 defined and described earlier in this disclosure, where the O-DU sends multiple beamforming weight sets, and each set is applied to a bundle of PRB s.

Figure 6:
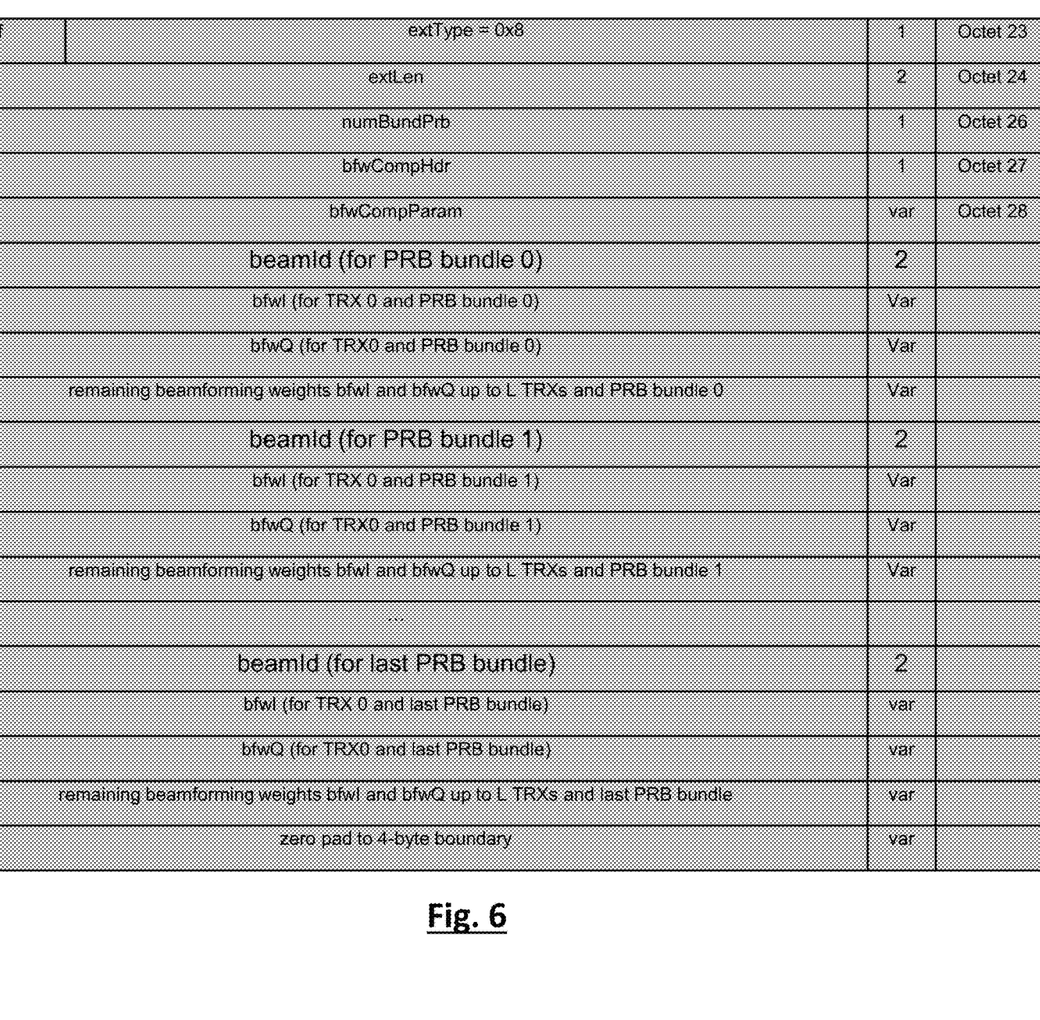
FIG. 6 illustrates another example data format for a new section extension type 8 according to the present disclosure, which data format is modified to include the beamIds.

The new section types include multiple beamIds based on the number of sets of beamforming weights defined in the section extension. The set of beamforming weights is defined as the beamforming weights for the L TRXs defined for a specific PRB or a bundle of PRBs. Specifically, the new section type 1 (which can be referred to as section type 8, or alternatively, by any number from 8-255) will be defined as follows. Section type 8 is used for most Downlink and Uplink radio channels when multiple sets of beamforming weights are sent in the new section extension type 8 defined in this disclosure. The fields of section type 8 can be explained as follows:

Transport Layer
Application Layer
Common Header Fields
dataDirection (data direction (gNB Tx/Rx)) field: 1 bit
payloadVersion (payload version) field: 3 bits
value="1" shall be set (1st protocol version for payload and time reference format)
filterIndex (filter index) field: 4 bits
frameId (frame identifier) field: 8 bits
subframeId (subframe identifier) field: 4 bits
slotID (slot identifier) field: 6 bits
startSymbolid (start symbol id) field: 6 bits
numberOfsections (number of sections) field: 8 bits
sectionType (section type) field: 8 bits
value="1" shall be set
udCompHdr (user data compression header) field: 8 bits 11
reserved (reserved for future use) field: 8 bits
Section Fields
sectionId (section identifier) field: 12 bits
rb (resource block identifier) field: 1 bit
symInc (symbol number increment command) field: 1 bit
startPrbc (starting PRB of data section description) field: 10 bits
numPrbc (number of contiguous PRBs per data section description) field: 8 bits
reMask (resource element mask) field: 12 bits
numSymbol (number of symbols) field: 4 bits
ef (extension flag) field: 1 bit
beamId (beam identifier) field for the first set of beamforming weights: 15 bits
beamId (beam identifier) field for the second set of beamforming weights: 15 bits
. . .
beamId (beam identifier) field for the last set of beamforming weights: 15 bits The same concept can be applied to the new section type 3 (which can be referred to as section type 9, or alternatively, by any number from 8-255). Specifically, section type 9 will be defined as follows. Section type 9 is used for PRACH and mixed-numerology channels when multiple sets of beamforming weights are sent in the new section extension type 8 defined in this disclosure. The fields of section type 9 can be explained as follows:

Transport Layer
Application Layer
  Common Header Fields
    dataDirection (data direction (gNB Tx/Rx)) field: 1 bit
    payloadVersion (payload version) field: 3 bits
      value="1" shall be set ($1^{st}$ protocol version for payload and time reference format)
    filterIndex (filter index) field: 4 bits
    frameId (frame identifier) field: 8 bits
    subframeId (subframe identifier) field: 4 bits
    slotID (slot identifier) field: 6 bits
    startSymbolId (start symbol identifier) field: 6 bits
    numberOfsections (number of sections) field: 8 bits
    sectionType (section type) field: 8 bits
      value="3" shall be set
    timeOffset (time offset) field: 16 bits
    frameStructure (frame structure) field: 8 bits
    cpLength (cyclic prefix length) field: 16 bits
    udCompHdr (user data compression header) field: 8 bits
  Section Fields
    sectionID (section identifier) field: 12 bits
    rb (resource block identifier) field: 1 bit
    symInc (symbol number increment command) field: 1 bit
    startPrbc (starting PRB of data section description) field: 10 bits
    numPrbc (number of contiguous PRBs per data section description) field: 8 bits
    reMask (resource element mask) field: 12 bits
    numSymbol (number of symbols) field: 4 bits
    ef (extension flag) field: 1 bit
    beamId (beam identifier) field for the first set of beamforming weights: 15 bits
    beamId (beam identifier) field for the second set of beamforming weights: 15 bits
    . . .
    beamId (beam identifier) field for the last set of beamforming weights: 15 bits
    freqOffset (frequency offset) field: 24 bits
    reserved (reserved for future use) field: 8 bits In another example embodiment of the present disclosure, the section extension type 8 previously defined and described in connection with FIG. 4 is modified to include the beamIds as shown in FIG. 6:

beamId (beam identifier)
Description: This parameter defines the beam pattern to be applied to the U-Plane data defined in the corresponding PRB bundle. The same beamId can be reused in the future to point to the same beamforming weights.

Note that this example embodiment can be implemented with the regular section types 1 and 3 defined in the O-RAN specs. In this case, the RU should ignore the beamId in the sectionId and use the beamIds defined in the section extension. This example embodiment can also be implemented with the previously-described new defined section types 1 and 3 which don't have beamIds at all.

Figure 7:
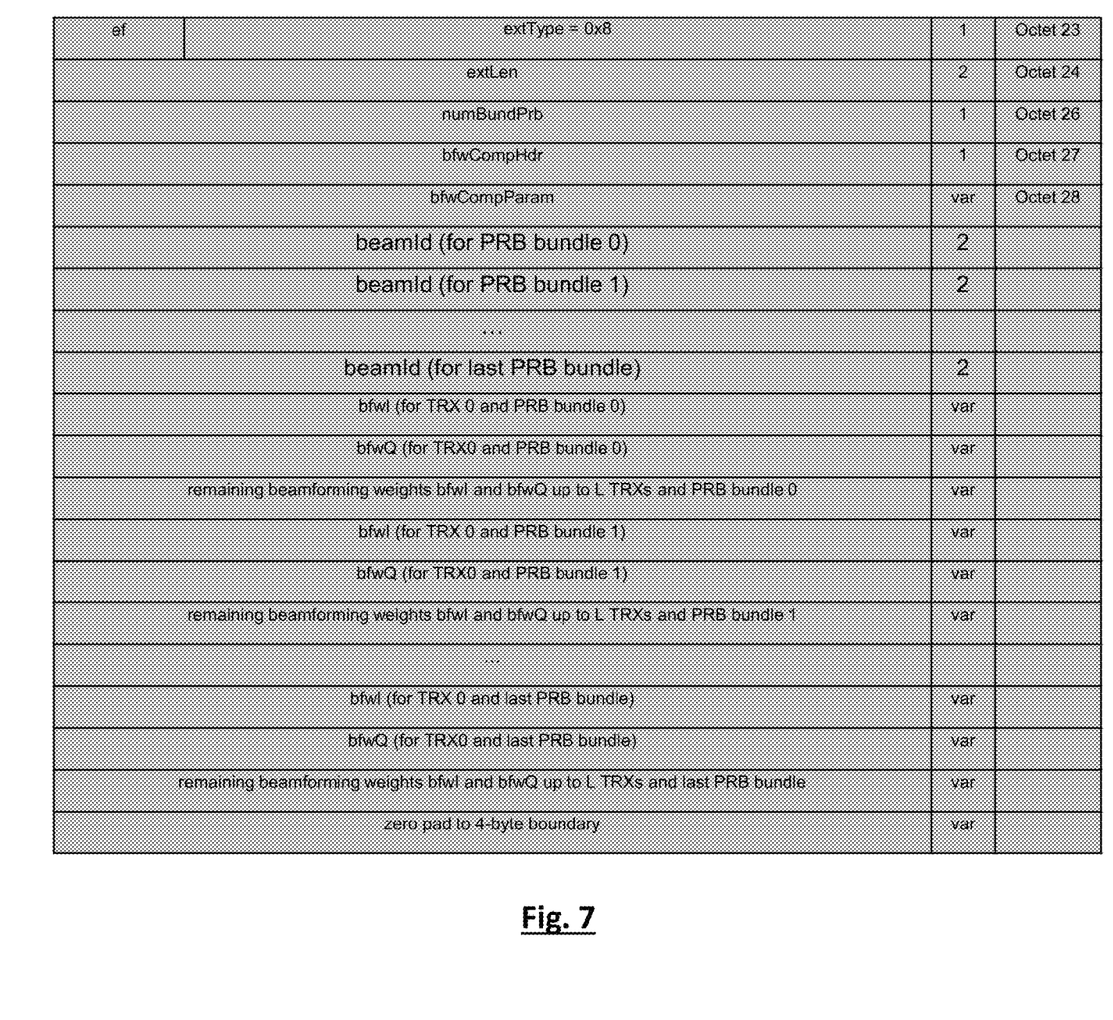
FIG. 7 illustrates another example data format for a new section extension type 8 according to the present disclosure, which data format is modified to include the beamIds.

In another example embodiment of the present disclosure, the O-DU includes the set of beamIds consecutively in the section extension type 8, then following the beamIds, includes the sets of beamforming weights (one set for each PRB bundle) as shown in FIG. 7.

In another example embodiment of the present disclosure, the O-RU aligns the application of the beamforming weights defined in section extension type 8 with the PRB bundling rules defined in 3GPP TS 36.213 Section 7.1.6.5 and 3GPP TS 38.214 Section 5.1.2.3. If the startPrbc, numPrbc, and numBundPrb defined in O-RAN section type and section extension don't align with the 3GPP definition of PRB bundles, the O-RU applies the first set of beamforming weights defined in the section extension to the first few PRBs until the PRBs boundary align with 3GPP definition of PRB bundling.

Based on TS 36.213 Section 7.1.6.5, a UE configured for transmission mode 9 for a given serving cell c may assume that precoding granularity is multiple resource blocks in the frequency domain when PMI/RI reporting is configured. Fixed system bandwidth dependent Precoding Resource block Groups (PRGs) of size P' partition the system bandwidth and each PRG consists of consecutive PRBs. If $N_{RB}^{DL}$ mod P'>0 then one of the PRGs is of size $N_{RB}^{DL}-P'\lfloor N_{RB}^{DL}/P' \rfloor$. The PRG size is non-increasing starting at the lowest frequency. The UE may assume that the same precoder applies on all scheduled PRBs within a PRG. The PRG size a UE may assume for a given system bandwidth is given by:

TABLE 7.1.6.5

| 1 in 3GPP TS 36.213 | |
| --- | --- |
| System Bandwidth ($N_{RB}^{DL}$) | PRG Size (P') (PRBs) |
| ≤10 | 1 |
| 11-26 | 2 |
| 27-63 | 3 |
| 64-110 | 2 |

The total PRBs in system BW are partitioned into groups of numBundPrbs consecutive PRBs, and the RU is configured to use the same weight in each group of numBundPrbs consecutive PRBs. As an example, if the system bandwidth is assumed to be 5 MHz (i.e., 25 PRBs), based on 3GPP, the PRG size is 2 PRBs. Hence, the UE assumes the PRBs are precoded as follows: (0,1), (2,3), (4,5), . . . (20,21), (22,23), (24). If the O-DU sets the startPrbc=1 and the numBundPRB=2. The O-RU should align the mapping between the precoding/beamforming weights with 3GPP bundling concepts. In other words, the O-RU should apply the first set of beamforming weights to ONLY PRB1, then apply the second set of beamforming weights to PRBs 2 and 3, then apply the third set of beamforming weights to (4,5), etc.

In another example embodiment of the present disclosure, the O-DU sends a single beamId in a section type, e.g., section type 1 or 3 as defined in the O-RAN specs. When the O-DU sends to the O-RU an extension type with multiple sets of beamforming weights corresponding to the section type with a single beam ID, the single beamId is applicable (e.g., as used by the O-RU) for the first set of beamforming weights in the extension type. Then, the O-RU increments the beamId by 1 for subsequent beamforming weights sets in the extension type. For example, this method is applicable to the newly defined section extension type 8 which doesn't have any beamIds, e.g., as shown in FIG. 4.

Figure 8:
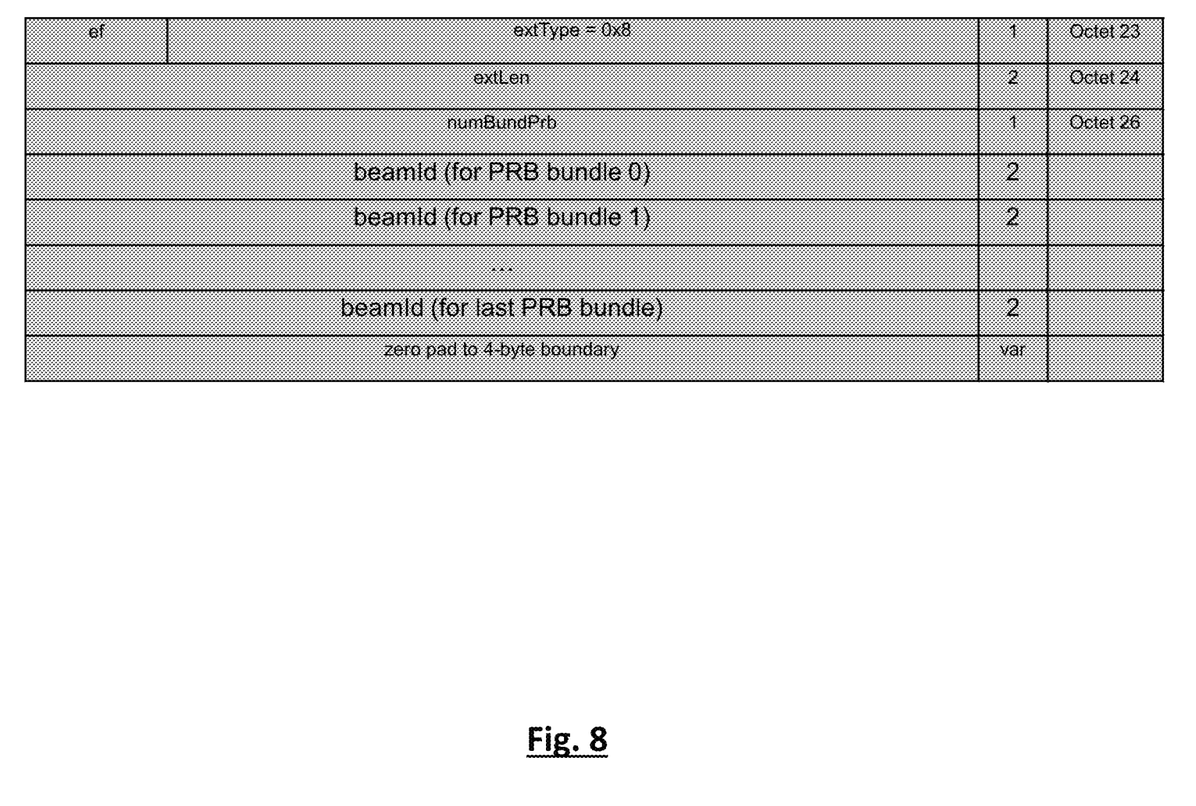
FIG. 8 illustrates an example data format for an embodiment of new section extension type 9 according to the present disclosure, which data format includes only the beamIds.

As discussed earlier in this disclosure, for specific transmission modes in LTE (e.g., TM7-TM10), where data resource elements (REs) are multiplexed with UE-specific reference signals (e.g., demodulation reference signal resource elements (DMRS REs)) in the frequency domain, different compression schemes can be applied for different data types. As an example, modulation compression is needed for data REs to reduce the fronthaul throughput, while a basic block floating point compression scheme can be used for DMRS REs. To do this, the O-DU needs to configure two C-plane messages with two different reMasks (one with DMRS RE locations and the other with data RE locations), since we can have only one compression method per C-plane message. In this case, The O-DU needs to send two different C-plane messages with orthogonal reMask. However, since all the REs within the same PRB are beamformed with the same beamforming weights, there's an additional overhead for sending these weights twice per PRB (or per PRB bundle), In another example embodiment of the present disclosure, the O-DU sends two separate C-plane messages, each with a different compression header (i.e., udCompHdr). In the first C-plane message, the O-DU uses the section extension to convey the beamforming weights for the first portion of the PRB (i.e., using reMask 1) to the O-RU, which stores the beamforming weights. In the second C-plane message, the O-DU uses the compliment of the reMask (i.e., reMask 2) and a new section extension (e.g., referenced as section extension type 9). In this example embodiment of section extension type 9 in the second C-plane message, the O-DU only includes the beamId(s), which act as pointer(s) to the beamforming weight(s), but not the actual beamforming weights, thereby reducing the fronthaul throughtput. Once received at the O-RU, the O-RU uses the beamId(s) in section extension type 9 to identify the actual beamforming weights, which were received in the first C-plane message. FIG. 8 illustrates an example data format for an embodiment of new section extension type 9 according to the present disclosure, which data format includes only the beamIds.

As a summary, several examples of the method according to the present disclosure are provided.

A first example of the method according to the present disclosure provides a method of enabling an Open RAN-compatible radio unit (O-RU) to apply different beamforming weights to different physical resource blocks (PRBs) using a single sectionId and a single section extension type of a section extension, comprising:
specifying a first mode of operation in which flexible sending of beamforming weights from Open RAN-compatible distributed unit (O-DU) to Open RAN-compatible radio unit (O-RU) is provided; and
providing, by the O-DU to the O-RU, i) a first parameter specifying the number of bundled physical resource blocks (PRBs) per a set of in-phase/quadrature (I/Q) beamforming weight pairs, each beamforming weight pair comprising an in-phase value and a quadrature value, and ii) a plurality of beamforming weight pairs for a plurality of transceivers associated with each bundle of PRBs;
wherein a new section extension type is provided, and wherein the O-DU sends the new section extension type to the O-RU, the new section extension type sent by the O-DU including at least one compression parameter for the O-RU to one of process or decompress the beamforming weights.

In a second example of the method modifying the first example of the method, the new section extension type only includes the beam identifiers, and the beamforming weights are not included.

In a third example of the method modifying the first example of the method, the at least one compression parameter includes at least one of i) beamforming weight compression header (bfwCompHdr) and ii) beamforming weight compression parameter (bfwCompParam).

In a fourth example of the method modifying the third example of the method, at least one of i) the bfwCompHdr is sent once in the section extension type, and ii) the bfwCompParam is sent multiple times in the section extension type.

In a fifth example of the method modifying the fourth example of the method, the bfwCompParam is sent once per each bundle of PRBs.

What is claimed is:

1. A method of enabling an Open RAN-compatible radio unit (O-RU) to apply different beamforming weights to different physical resource blocks (PRBs) using a single sectionId and a single section extension type of a section extension, comprising:
specifying a first mode of operation in which flexible sending of beamforming weights from Open RAN-compatible distributed unit (O-DU) to Open RAN-compatible radio unit (O-RU) is provided; and
providing, by the O-DU to the O-RU, i) a first parameter specifying the number of bundled physical resource blocks (PRBs) per a set of in-phase/quadrature (I/Q) beamforming weight pairs, each beamforming weight pair comprising an in-phase value and a quadrature value, and ii) a plurality of beamforming weight pairs for a plurality of transceivers associated with each bundle of PRBs;
wherein a new section extension type is provided, and wherein the O-DU sends the new section extension type to the O-RU, the new section extension type sent by the O-DU including at least one compression parameter for the O-RU to one of process or decompress the beamforming weights.

2. The method of claim 1, wherein the new section extension type only includes the beam identifiers, and the beamforming weights are not included.

3. The method of claim 1, wherein the at least one compression parameter includes at least one of i) beamforming weight compression header (bfwCompHdr) and ii) beamforming weight compression parameter (bfwCompParam).

4. The method of claim 3, wherein at least one of i) the bfwCompHdr is sent once in the section extension type, and ii) the bfwCompParam is sent multiple times in the section extension type.

5. The method of claim 4, wherein the bfwCompParam is sent once per each bundle of PRBs.

* * * * *